United States Patent [19]

Markow

[11] Patent Number: 4,734,144
[45] Date of Patent: Mar. 29, 1988

[54] BANDED-TIRE BUILDING METHOD
[75] Inventor: Edward G. Markow, Oakdale, N.Y.
[73] Assignee: Grumman Aerospace Corporation, Bethpage, N.Y.
[21] Appl. No.: 727,322
[22] Filed: Apr. 25, 1985
[51] Int. Cl.$^4$ .............................................. B29D 30/06
[52] U.S. Cl. .................... 156/123; 156/130; 156/130.3; 156/130.5
[58] Field of Search ............... 156/130.3, 123, 133, 156/130, 173, 313, 130.5; 152/156, 158, 516, 520, 530, 537

[56] References Cited

U.S. PATENT DOCUMENTS

| 1,220,178 | 3/1917 | Brucker | 156/130.3 |
|---|---|---|---|
| 3,315,722 | 4/1967 | Marzocchi et al. | 152/537 X |
| 3,372,078 | 3/1968 | Faesti | 156/306 |
| 3,390,714 | 7/1968 | Marzocchi et al. | 152/537 X |
| 3,422,874 | 1/1969 | Weitzel | 156/126 X |
| 3,583,463 | 6/1971 | O'Neil | 152/537 X |
| 3,663,333 | 5/1972 | Palfreyman | 156/313 X |
| 3,677,852 | 7/1972 | Fleuret et al. | 156/127 |
| 3,698,975 | 10/1972 | Hogan, Jr. | 264/326 X |
| 3,891,740 | 6/1975 | Vannan, Jr. | 264/326 X |
| 3,933,553 | 1/1976 | Seiberling | 156/123 |
| 3,969,568 | 6/1976 | Sperley | 156/123 X |
| 3,976,739 | 8/1976 | Carn | 264/326 X |
| 3,990,930 | 11/1976 | Schmit | 156/123 |
| 4,039,366 | 8/1977 | Yabe | 156/126 X |
| 4,065,338 | 12/1977 | Mirtain | 264/326 X |
| 4,111,249 | 9/1978 | Markow | 152/520 X |
| 4,127,039 | 11/1978 | Hollaway, Jr. | 156/123 X |
| 4,166,883 | 9/1979 | Seiberling | 156/123 X |
| 4,263,083 | 4/1981 | Schleiger | 156/414 |
| 4,299,871 | 11/1981 | Forsch | 156/92 X |
| 4,308,083 | 12/1981 | Toth, Jr. | 156/129 |
| 4,318,434 | 3/1982 | Markow | 152/530 X |
| 4,428,411 | 1/1984 | Markow et al. | 152/156 X |
| 4,456,048 | 7/1984 | Markow et al. | 152/520 X |

Primary Examiner—Donald E. Czaja
Assistant Examiner—Ramon R. Hoch
Attorney, Agent, or Firm—Pollock, VandeSande & Priddy

[57] ABSTRACT

An annular band is positioned between a tire carcass and the crown portion. The band is comprised of individual laminate sheets that are pre-impregnated with a high fracture toughness resin that resists microtears. The individual sheets of the band are stitched together thereby enhancing the interlaminar shear resistance of the band. The curing process is expedited by co-curing the band, positioned in place, over the tire carcass. A plastic film covers the interface between the band and adjacent rubber to prevent contamination of the interface materials.

4 Claims, 7 Drawing Figures

BANDED-TIRE BUILDING METHOD

FIELD OF THE INVENTION

The present invention relates to radial tires and more particularly to a band-reinforced radial tire.

BACKGROUND OF THE INVENTION

My prior U.S. Pat. No. 4,111,249 relates to a basic resilient pneumatic tire which is provided with a band between the crown and the carcass portions of the tire which permit such a tire to be operated at reasonable speeds in a substantially normal manner irrespective of the state of pressurization of the tire. This capability is provided in the tire when pneumatic support is reduced or absent by means of an annular structural compression element which is stabilized by radial reinforcing means. A solid high-strength band fixed in place in the crown of the tire radially inward with respect to the tread can be utilized as the compression element. This band is stabilized by the radial means which behave in a manner similar to individual tensile spokes to provide load supporting strength such that the band is reinforced thereby. The tire of this invention can be completely depressurized and, with a predetermined deflection that will range approximately 30 to 50% of the pressurized condition, it will bear the weight of the vehicle such that it can be driven at reasonable speeds without an appreciable or dangerous degradation in its handling qualities or performance.

In the tires of this type, the annular compression element which reinforces the tire is stabilized by radial elements in the sidewalls of the tires. The radial elements can be one or more plies of radial textile cords or metal wires. Various tire constructins are known in the art that have a casing or carcass comprising one or more plies of weftless cord (or wire) fabric extending from bead to bead wherein the cords in each ply are substantially radial in orientation; i.e., the cords are oriented substantially normal to the beads and the crown centerline of the tire. In a monoply radial tire construction, the casing cords normally have a 90° bias angle; i.e., in the unshaped carcass they extend perpendicular to the planes of the beads. In a two-ply radial tire construction, the cords in each casing ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these casing or carcass constructions are contemplated within the scope and meaning of the expressions "radial" and "substantially radial" as used herein.

Therefore, the banded tire of the mentioned patent provides a reinforced pneumatic tire that has the compatibility of use in vehicles of a conventional tire yet which will enable the vehicle with which it is used to be operated safely at reasonable speeds after a blowout or other damage causing a partial or complete loss of pressurization. The tire has a radially stabilized annular reinforcing compression band in which the bending stiffness and centrifugal forces created by the band mass and the stability influence of the radial reinforcing means ensure safety against instability in the event of high-speed blowouts, particularly those occurring with coupled highway vehicles such as trucks and trailers or with aircraft during landing or takeoff runs.

The reinforced pneumatic tire has restrained carcass and tread motion at operational speeds such that the rolling resistance is lower than in conventional radial tires especially at low inflation pressures. A large percentage of the load is carried in the elastic properties of the band reinforcement incorporated therein such that the added restraint to carcass motion (standing wave phenomenon) results in lower tire heating at higher speeds whereby high locomotion efficiency is achieved.

The homogeneous band has an inherent lateral stiffness that furnishes a high resistance to side loads for given foot-print lengths to provide high steering authority such that the margin of safety in operation is increased significantly when compared to conventional tires.

The tire can be operated safely while unpressurized or under partial inflation such that the tire "foot print" is elongated and the "bulldozing" resistance is reduced by the low entry angle into the soil so that superior weak-soil performance is obtained. The design permits a selection to be made from a variety of high-strength materials for use in the band and in which also a choice in the construction materials and dimensions of the band can be made to thereby give a desirable uniform footprint pressure at a given deflation level such that the weak-soil performance is enhanced.

BRIEF DESCRIPTION OF THE PRESENT INVENTION

The present invention is an improvement of the tire structure set forth in my earlier patent. The present invention is directed to a method and tire construction which allows a structural band to be fabricated within the tire and co-cured therewith by utilizing the same heating and pressure environment as used in connection with the tire carcass construction. This allows for a more compatible environment during the application of segmented molding procedures.

Co-curing, in which a band is brought to its final strength and stiffness in the heated tire mold, is attractive from a production standpoint because it eliminates an entire curing operation and removes any restrictions on the molding process which cater to a rigid band.

Co-cured bands can be incorporated by directly wrapping "B" staged (partially cured) fiberglass reinforced epoxy material over the carcass of the tire on an inflated building drum, or by winding it on a separate mandrel, "B" staging the wound band and finally slipping the still-flexible band over the drum as with the pre-cured band.

It has been found that by using pre-impregnated laminate tapes or elongated sheets of material, the band for a tire may be quickly positioned in place and lends itself to co-curing with the tire carcass.

By applying stitching to the "B" staged band assembly, two major advantages are gained. First, the stitching mechanically ties all the layers of the band together so that during the highly fluid phase of cure, every layer is in its proper position. Second, interlaminar shear resistance is significantly enhanced by the transverse structural ties provided by the stitching.

The present invention further envisions the utilization of high fracture toughness resins as a band laminate impregnation material which should reduce microcracking in the band structure while in use.

Possible contamination of the interface materials, including the carcass tread and the band resin, is reduced to a minimum by the utilization of a plastic film which encapsulates the band.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
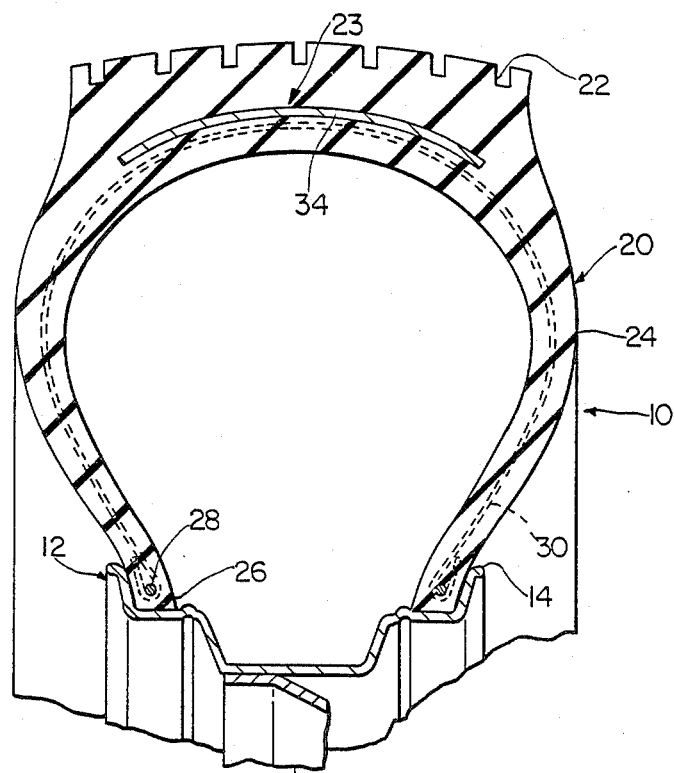
FIG. 1 is a sectional view of a banded tire in accordance with the prior art.
Figure 2:
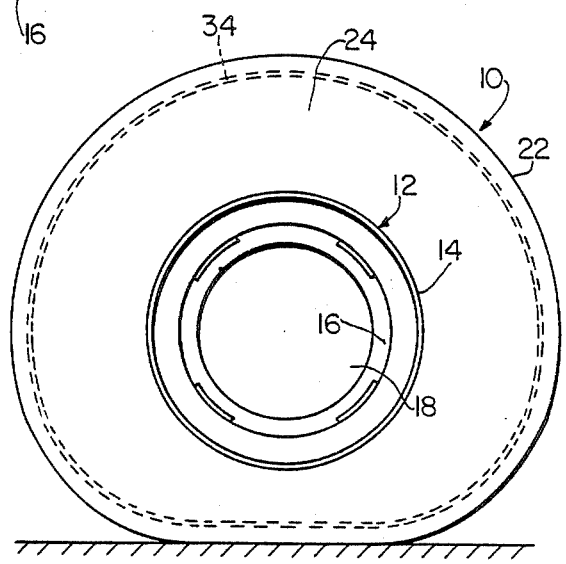
FIG. 2 is a side elevational view of the tire embodied in FIG. 1.

Referring now to the drawings, FIG. 1 illustrates an embodiment of a tire 10 of the type disclosed in my previous U.S. Pat. No. 4,111,249, which will be discussed to enable comprehension of the present invention dealing with an improved method of manufacture. The tire is mounted on a wheel 12 which may be of a conventional type having a drop center rim 14 welded to a wheel body 16. As is well known, the wheel 12 may be provided with a wheel cover 18 (see FIG. 2). Tire 10 comprises a carcass 20 having an outer peripheral tread portion 22 on the crown which is bonded to the carcass. Side walls 24 extend on either side thereof to beads 26 in the inside peripheral portions of the sidewalls.

Tread 22 may be incised with the usual tread patterns or may be provided with cleats to improve tire traction or to serve other known considerations. Beads 26, which may be reinforced in a known manner with suitable annular cords or wires 28, are adapted to seat in an airtight relationship on the rim 14 of the wheel when the tire is mounted thereupon. The sidewalls 24 of the casing are reinforced by the usual known weftless radial elements 30 which may be of two-ply textile construction. As is known, the plies can be composed of fibers of rayon, nylon, polyester and the like or can be made with steel wires. When mounted on the wheel, tire 10 can be inflated through a regular rim valve (not shown) in the wheel in a well-known manner. High performance in off-the-road operation and during other operating conditions is achievable with the tire partially or totally unpressurized; optimum performance in other driving conditions may require full inflation pressure. Located in the crown 23 of the tire underlying the tread 22 thereof is an annular compression element or band 34 which is suitably integrated or bonded into the casing or carcass 20 of the tire. Band 34 may be fabricated out of a solid strip of any suitable high-strength metal or alloy or of a high-strength composite reinforced by a material such as glass, graphite or Kevlar. As shown in FIG. 1, band 34 can be designed with a modest curved cross-section having the convex side of the curvature facing radially outward. A curvature or crown of about a 30-inch radius has proved satisfactory in service.

In this invention the stabilization of the annular compression element or band 34 by the radial reinforcing elements 30 contributes importantly to the optimum results achieved in operation. A variety of structural materials can be used for the radial elements and the band. However, I have had success using design parameters in the relationship $$(r^4 K_s / E_b I_b C_b) = M$$

In which:

M = 10 to 100
r = outside radius of the undeflected tire
$K_s$ = radial spring rate equivalent of the unpressurized sidewall in pounds/inch
$E_b$ = modulus of elasticity of the band
$I_b$ = moment of inertia of the band
$C_b$ = Circumference of the band The product of the modulus of elasticity and the moment of inertia of the band cross-section should remain near constant. Increased values (up to 50%) have shown good results for lower modulus $(3-5 \times 10^6)$ materials. Values of Ks typically range from about 200 to about 600 pounds/inch.

It should be pointed out that the lower values of the $(r^4 K_s / E_b I_b C_b)$ constant contribute a smaller change in ground contact and give a stiff reinforcing band, producing a "sprung hub" type of behavior. At higher values of the constant, ground contact is increased and the band shares a larger percentage of the load. It will be appreciated that, at higher values of the constant, the band will undergo higher bending stresses. Prestressing techniques for putting the unpressurized sidewall elements in tension has the effect of increasing the value of Ks and thereby reducing a portion of the deflection of the tire. Variations in the thickness of the band change the foot print and other characteristics of the tire.

In my earlier patent band 34 was indicated as being fabricated out of a solid annular band of composite materials comprising filaments or fibers of high-strength material such as graphite, fiberglass, Kevlar, and the like, embedded in a resin matrix. Fabrication of such composite annular bands can utilize filament winding techniques in which a filament of Kevlar, for instance, is wound on an elongated mandrel whose outside diameter is approximately the inside diameter of the finished band. A continuous filament is impregnated in the matrix material, which generally is an epoxy resin, and is wound on the mandrel. After curing, hoops or bands of the required width are sliced off the elongated process band. However, the present invention as will now be discussed incorporates a differently constructed band and offers advantages not previously available.

The Improvement

Figure 3:
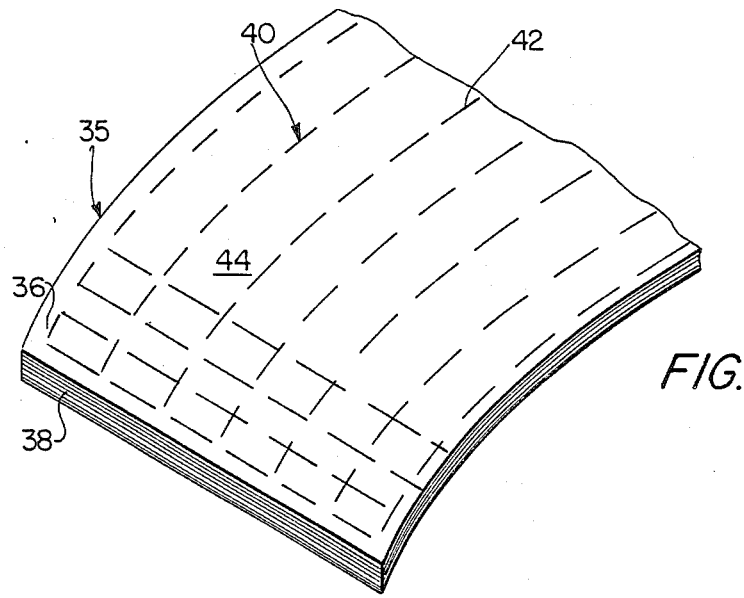
FIG. 3 is a diagrammatic view of a band structure as incorporated in the present invention.

FIG. 3 illustrates one aspect of the present invention which relates to a new construction of a band 35 to be used in the same manner as band 34 of the prior art tire just discussed. It is fabricated from a plurality of laminate sheets between and including sheets 36 and 38. The sheets may be pre-impregnated with epoxy resin as is available from the 3M Corporation. Utilization of pre-impregnated sheets obviously reduces the time necessary to form a laminated band and therefore results in fabrication economy.

In a preferred embodiment of the invention, the individual sheets of band 35 are impregnated with a high fracture toughness resin that resists microcracks due to extensive molecular cross links of the resin. The result is an enhanced resistance to laminar shear by the resin. Such resins are available from American Cyanamid Corporation and are designated as the CYCOM family of resins. Other sources include CIBA-Geigy Corporation, Hysol Corporation and others.

In order to provide transverse structural reinforcement, an important aspect of the invention is the inclusion of stitching through the sheets of band 35 as generally indicated by reference numeral 40. The stitching will include stitching 42 along the length of the band as well as stitching 44 along its width. The existence of the vertical stitching 46 (FIG. 4) applied to the "B" staged band assembly provides two major advantages. First, the stitching mechanically ties all the layers of the band together so that during the highly fluid phase of cure, every layer is in its proper position. Second, interlaminar shear resistance is significantly enhanced by the transverse structural ties provided by the stitching.

A most significant aspect of the present invention relates to the co-curing of the band with the tire carcass. Co-curing, in which the band is brought to its final strength and stiffness in a heated tire mode, is attractive from a production point of view as previously discussed. Co-cured bands can be incorporated into the tire structure of the present invention as follows. The band can be incorporated by directly wrapping "B" staged composite material (glass, Kevlar, or graphite) over the carcass inflated on a building drum. The wrapped material, having an inherent tacky surface, would then be stitched or stapled to provide stability during the final cure process and additional interlaminar shear strength in its final cured state.

Another approach is that of providing a "B" staged band assembly, made on a separate mandrel, removed and stitched, then slipped over the carcass as a current breaker assembly is applied in conventional radial tire construction. A variant of the above-described band assembly is that of using a knitting technique using pre-impregnated fiber. This technique can provide a high tailored fabric orientation (longitudinal for hoop strength, lateral for lateral bending, and vertical to inhibit interlaminar shear) to more closely optimize the structural efficiency of the band. The finished knitted band of pre-impregnated fiber is slipped over the carcass as a non-rigid (limp) assembly just as previously described. A small terminal expansion of the carcass on the building drum can be used to establish the debulking of the band material and fiber pretension. The selection of either of these approaches would depend upon specific design criteria. The stitched band is placed over a carcass and then expanded in a mold to press the band to the carcass. The tread rubber and additional rubber components are added to the carcass and put in a mold. The curing time and temperature of the resin in the band matches that of the rubber in the tire to permit the band to be cured in situ. The in situ molded band will conform to the natural tire crown radius.

Figure 5:
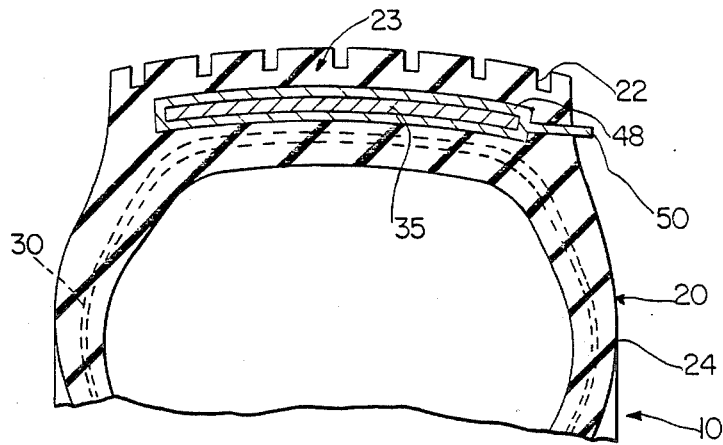
FIG. 5 is a sectional view of a further embodiment of the present invention.

Depending on materials used, it may be necessary to cover the band with an impermeable film to prevent the rubber from becoming contaminated by the epoxy resin and cause problems. The film must be the type which would allow the resin to bond to the film and the rubber to bond to the film so that a structurally sound interface between the band and the adjoining rubber is achieved. The film could be a plastic film selected from a list of 350° F. resistant thermoplastics which would be impermeable yet adherent to both epoxy and rubber formulations. Other film selection criteria include: toughness, flexibility, elongation, tensile strength, tear strength, and cost. Candidate materials are cellulosics, polyamides, polyesters, polyethersulfane, and polysulfane. FIG. 5 illustrates the inclusion of a plastic film 48 around band 35. Bleeder wick 50 allows gases, generated from the epoxy resin during curing to be expelled.

As will be appreciated, the above-described invention offers substantial advantages which compared with the prior art. By virtue of co-curing the band in situ within the tire, one curing operation is eliminated during the fabrication process resulting in economies of manufacture. By applying stitching to the sheets of the band, every sheet is maintained in its proper position throughout a fabrication process. Second, interlaminar shear resistance is significantly enhanced by the transverse structural ties provided by the stitching. The stitched band also allows ease in combining laminate layers of differing characteristics (both resin and fiber orientation).

Appropriate thin film adhesives interspersed between the laminate sheets enhance laminate toughness to impact thereby increasing fatigue life of the tire.

Figure 6:
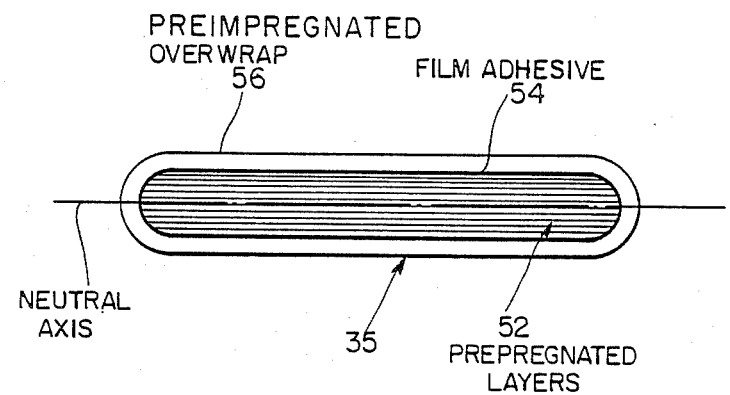
FIG. 6 is a sectional view of a modified band for the present invention.
Figure 7:
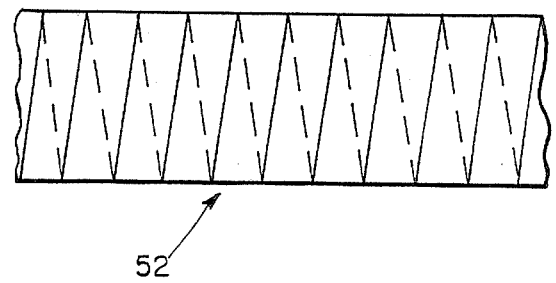
FIG. 7 is a partial plan view of a spiral wrapped band.

FIGS. 3 and 5 previously described the band 35 as being fabricated from a plurality of laminate sheets. In an alternate embodiment of the present invention as illustrated in FIGS. 6 and 7, an impact toughened structure is shown and the fabrication of band 35 is indicated as a series of layers including bi-directionally wrapped pre-impregnated spiral layers which may be wound on a male mandrel during manufacture and removed while flexible to form the central portion of band 35, typically occupying 2/6 of the thickness of the band on each side of the neutral axis. The spiral wrap may be developed from a tape of pre-impregnated spirally wrapped layers 52 and is covered with a conventional film adhesive 54 which serves to adhere an overwrap layer 56 to the layers 52 and is preferably spirally wound unidirectionally. The overwrap 56 is likewise fabricated from a spirally wrapped impregnated tape identical to that comprising the pre-impregnated layers 52 but wrapped preferably in a single direction as opposed to being bidirectional, as was the case with the pre-impregnated layers 52. The disposition of the film adhesive 54 as indicated improves the resultant tire's toughness to impact. The film adhesive's lower modulus enables the film adhesive layer to act as a stress distributor for impact loads, which helps in preventing band cracking, thus making the tire tougher.

Figure 4:
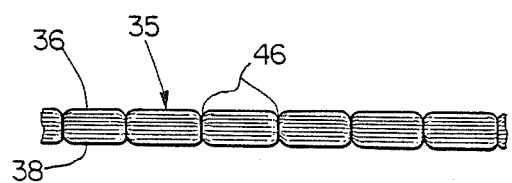
FIG. 4 is a diagrammatic cross sectional view of the band illustrated in FIG. 3.

In a further embodiment of the invention, the stitched laminated layers of band 35 shown in FIGS. 3 and 4 may be replaced by a single knitted pre-impregnated layer with an appropriate ratio of circumferential and lateral fibers. Inherent in the knitting process, fibers extend through the thickness of the material thereby providing the much-desired strength-inhibiting interlaminar shear failure. The knitting may be accomplished on a separate fixture using pre-impregnated material and applied to a tire as a conventional limp breaker band assembly is currently applied in a conventional process.

The knitting process can uniquely apply different strength fibers within the band construction to enhance desired structural properties, e.g., graphite at the edges where the highest fatigue resistance is desired, aramid interlacing to inhibit interlaminar shear; different fibers being integrated with the economic use of fiberglass.

The additional recognized advantage of a knitted assembly is the fact that there are no cut fibers at the edge of the band. The raw edge of cut fibers at the band edge decrease the strength of the very area where stress is a maximum and failures are initiated.

It should be understood that the invention is not limited to the exact details of construction shown and described herein for obvious modifications will occur to persons skilled in the art.

I claim:

1. A method of fabricating a banded tire comprising the steps:
   impregnating the layers of a reinforcing band with a preselected resin to form an uncured laminated band;
   positioning the uncured laminated band as a breaker assembly around an uncured tire carcass;
   limiting curing of the band and the carcass for the same time period only, wherein the band and carcass are co-cured in situ; and
   applying an impermeable plastic film around the surface of the band, before the positioning step, to protect rubber at the band-rubber interface from contamination by the resin.

2. The method set forth in claim 1 together with the step of stitching only the layers of the band, before the step for applying an impermeable plastic film around the band surface, for increasing its resistance to interlaminar shear.

3. A method for fabricating a banded tire comprising the steps:
   spirally winding a plurality of resin impreganated layers over a mandrel;
   covering the plurality of layers with an adhesive film;
   overwrapping the adhesive film with at least one spirally wound layer of resin-impregnated reinforcing material to form an uncured laminated band;
   removing the resulting laminated band from the mandrel;
   positioning the uncured laminated band as a breaker assembly around an uncured tire carcass; and
   limiting curing of the band and the carcass for the same time period only, wherein the band and carcass are co-cured in situ;
   wherein the utilization of the adhesive film improves fracture toughness of the band when subjected to impact loading;
   applying an impermeable plastic film around the surface of the band, before the positioning step, to protect rubber at the band-rubber interface from contamination by the resin.

4. A method for fabricating a banded tire comprising the steps:
   spirally winding a plurality of resin impregnated layers over a mandrel;
   covering the plurality of layers with an adhesive film;
   overwrapping the adhesive film with at least one spirally wound layer of resin-impregnated reinforcing material to form an uncured laminated band;
   removing the resulting laminated band from the mandrel;
   stitching the layers of the band for increasing the tire's resistance to interlaminar shear;
   applying an impermeable plastic film around the surface of the band to protect rubber at a band-rubber interface of a resultant tire from contamination by the rubber;
   positioning the uncured laminated band as a breaker assembly around an uncured tire carcass; and
   limiting curing of the band and the carcass for the same time period only, wherein the band and carcass are co-cured in situ;
   wherein the utilization of the adhesive film improves fracture toughness of the band when subjected to impact loading.

* * * * *

UNITED STATES PATENT AND TRADEMARK OFFICE
CERTIFICATE OF CORRECTION

PATENT NO. : 4,734,144
DATED : March 29, 1988
INVENTOR(S) : Edward G. Markow

It is certified that error appears in the above-identified patent and that said Letters Patent is hereby corrected as shown below:

Column 1, line 35, change "constructins" to --constructions--.

Column 7, line 30, change "impreganated" to --impregnated--.

Signed and Sealed this

Thirteenth Day of September, 1988

Attest:

DONALD J. QUIGG

*Attesting Officer*    *Commissioner of Patents and Trademarks*